(12) United States Patent
Mross et al.

(10) Patent No.: US 6,965,625 B2
(45) Date of Patent: Nov. 15, 2005

(54) APPARATUSES AND METHODS FOR GENERATING COHERENT ELECTROMAGNETIC LASER RADIATION

(75) Inventors: Michael R. Mross, Putney, VT (US); Thomas H. Lowell, Dummerston, VT (US); Robert A. Durant, Dummerston, VT (US); Peter B. Sewell, Woodlawn (CA)

(73) Assignee: Vermont Photonics, Inc., Bellows Falls, VT (US)

(*) Notice: Subject to any disclaimer, the term of this patent is extended or adjusted under 35 U.S.C. 154(b) by 270 days.

(21) Appl. No.: 09/961,707

(22) Filed: Sep. 24, 2001

(65) Prior Publication Data

US 2002/0097755 A1 Jul. 25, 2002

Related U.S. Application Data

(60) Provisional application No. 60/235,149, filed on Sep. 22, 2000.

(51) Int. Cl.[7] .............................. H01S 3/00; H01S 3/09; H01S 3/08

(52) U.S. Cl. .............................. 372/74; 372/2; 372/102

(58) Field of Search .............................. 372/2, 74, 102, 372/35, 64, 34, 36

(56) References Cited

U.S. PATENT DOCUMENTS

| | | | | |
|---|---|---|---|---|
| 3,609,585 A | * | 9/1971 | Hufnagel | 372/99 |
| 3,639,774 A | | 2/1972 | Wolff | 307/88.3 |
| 3,958,189 A | | 5/1976 | Sprangle et al. | 331/94.5 PE |
| 4,043,670 A | * | 8/1977 | Kozlov et al. | 356/455 |
| 4,215,320 A | | 7/1980 | Chang | 331/94.5 G |
| 4,255,017 A | | 3/1981 | Hasegawa | 350/96.29 |

(Continued)

FOREIGN PATENT DOCUMENTS

| | | | |
|---|---|---|---|
| FR | 2653903 | * | 10/1989 |
| FR | 2653903 | * | 5/1991 |
| JP | 52090430 | * | 7/1977 |
| WO | WO 00/72413 A2 | | 5/2000 |

OTHER PUBLICATIONS

Qiong Wang, Robert W. Schoenlein, Linda A. Peteanu, Richard A. Mathies, Charles V. Shank, (1994), "Vibrationally Coherent Photochemistry in the Femtosecond Primary Event of Vision", *Science* vol. 226: pp. 422–424.

Leyun Zhu, J. Timothy Sage, Paul M. Champion, (1994), "Observation of Coherent Reaction Dynamics in Heme Proteins", *Science*, pp. 629–631.

(Continued)

*Primary Examiner*—Minsun Oh Harvey
*Assistant Examiner*—Armando Rodriguez
(74) *Attorney, Agent, or Firm*—Scott E. Kamholz; Foley Hoag LLP (57) ABSTRACT

The present disclosure is directed to laser apparatuses for generating coherent electromagnetic laser radiation having an electron beam generator, a diffraction grating element oriented such that a beam of electrons from the electron beam generator is directed over the diffraction grating element, and at least one wing element coupled to the diffraction grating element. In some embodiments, the wing element(s) can be coupled to a top portion of the diffraction grating element. While in others, the wing element(s) can be coupled to a side portion of the diffraction grating element. The present disclosure is also directed to methods of manufacturing diffraction grating elements involving placing at least one secondary conducting sheet having a first height on at least one primary conductive sheet having a different second height, and securing the primary and secondary conductive sheets together. The primary and secondary conductive sheets can be alternating and their thicknesses may also be different. Additionally, the primary and secondary conductive sheets may be secured via a clamping device.

46 Claims, 8 Drawing Sheets

U.S. PATENT DOCUMENTS

| | | | |
|---|---|---|---|
| 4,438,513 A | | 3/1984 | Elias et al. .................... 372/2 |
| 4,491,948 A | | 1/1985 | Deacon et al. ................ 372/2 |
| 4,529,942 A | | 7/1985 | Patel et al. .................. 330/4.3 |
| 4,538,275 A | | 8/1985 | Szu ............................... 372/4 |
| 4,571,726 A | * | 2/1986 | Wortman et al. .............. 372/2 |
| 4,663,932 A | | 5/1987 | Cox ........................... 60/200.1 |
| 4,682,053 A | | 7/1987 | Pickett et al. ............... 307/425 |
| 4,727,550 A | | 2/1988 | Chang et al. ................... 372/2 |
| 4,740,973 A | | 4/1988 | Madey et al. ................... 372/2 |
| 4,874,953 A | | 10/1989 | Katz ....................... 250/493.1 |
| 4,891,600 A | | 1/1990 | Cox ........................... 328/233 |
| 4,915,463 A | * | 4/1990 | Barbee, Jr. .................. 359/360 |
| 5,060,232 A | | 10/1991 | Etievant ........................ 372/2 |
| 5,243,618 A | | 9/1993 | Dolezal et al. ............... 372/92 |
| 5,263,043 A | | 11/1993 | Walsh ........................ 372/102 |
| 5,268,693 A | | 12/1993 | Walsh ........................ 372/74 |
| 5,736,709 A | | 4/1998 | Neiheisel ............... 219/121.61 |
| 5,790,585 A | | 8/1998 | Walsh ........................ 372/102 |
| 5,948,172 A | | 9/1999 | Neiheisel ....................... 134/1 |
| 6,060,293 A | | 5/2000 | Bohr et al. .............. 435/173.1 |
| 6,196,226 B1 | | 3/2001 | Hochman et al. ........ 128/653.1 |
| 2002/0187533 A1 | | 12/2002 | Mross et al. ............. 435/173.1 |

OTHER PUBLICATIONS

Diehl M, Doster W, Petry W, Schober H, (1997), "Water coupled low–frequency modes of myoglobin and lysozyme observed by inclastic neutron scattering", *Biophys Journal* vol. 73(5), pp. 2726–2732.

Aihua Xie, Alexander F.G. van der Meer, Robert H. Austin, (2001) "Excited–State Lifetimes of Far–Infrared Collective Modes in Proteins", *Physical Review Letters* vol. 88 (1), pp. 018102–1–018102–4.

Joel E. Boyd, Ari Briskman, and Vicki L. Colvin, (2001) "Direct Observation of Terahertz Surface Modes in Nanometer–Sized Liquid Water Pools", *Physical Review Letters*, vol. 87 (14), pp. 147401–1–147401–4.

Yufeng Zhou, Joao H. Morais–Cabral, Amelia Kaufman & Roderick MacKinnon, (2001), "Chemistry of ion coordination and hydration revealed by a K+ channel–Fab complx at 2.0 A resolution", *Nature* vol. 144, pp. 43–48.

Donald E. Ingber, (1998) "The Architecture of Life", *Scientific American*, vol. 278(1): Cover Story.

J Hone, B. Batlogg, Z. Benes, A.T. Johnson, J.E. Fischer, (Sep.), "Quantized Phonon Spectrum of Single–Wall Carbon Nanotubes", *Science*, pp. 1730–1733.

R. Savage, "*What are microtubules?*", pp. 1–3 [retrieved on Jan., 10, 2001]. Retrieved from the Internet: <URL:http://www.reed.edu/~rsavage/microtubules.html>.

Department of Physics, Tuszynski Group, Microtubules, (Jan.), "*Physical Properties of Microtubules*", pp. 1–3 [retrieved on Jan. 10, 2001]. Retrieved from the Internet: <URL:http://www.phys.ualberta.ca/~biphys/microtubules.html>.

Hans Frauenfelder, Stephen G. Sligar, Peter G. Wolynes, (1991), "The Energy Landscapes and Motions of Proteins", *Science* vol. 254, pp. 1598–1603.

Robert H. Austin, Mark W. Roberson, and Paul Mansky, (1988), "Far–Infrared Perturbation of Reaction Rates in Myoglobin at Low Temperatures", *Physical Review Letters* vol. 62(16), pp. 1912–1915.

Carlo Sirtori, (2002) "Bridge for the Terahertz Gap", *Nature* vol. 417, pp. 132–133.

Rüdeger Kohler, Alessandro Tredicucci, Fabio Beltram, Harvey E. Beere, Edmund H. Linfield, A. Giles Davies, David A. Ritchie, Rita C. Iotti & Fausto Rossi, (2002) "Terahertz semiconductor–heterostructure laser", *Nature*, pp. 156–159.

Minute of the Bordeaux Forum, (2000), "Future European Research on Mobile Communication and Health", pp. 1–3 [retrieved on Feb. 21, 2002]. Retrieved from the Internet: <URL:http://www.frascati.enea.it/THz–BRIDGE/Bordeaux99.htm>.

J.E. Walsh, J.H. Brownell, J.C. Swartz, (1999), "A New Source of THz–FIR Radiation", pp. 1–9 [retrieved on Jun. 11, 2001]. Retrieved from the Internet: <URL:http://ieee.org/organizations/pubs/newsletters/leos/feb99/hot2.htm>.

The University of Chicago Department of Physics, (2001), "Research", pp. 1–4 [retrieved on Feb. 11, 2002]. Retrieved from the Internet:<URL:htp//physics.uchicage.edu/research.html>.

E. Schamiloglu, S.R.J. Brueck, and F. Hegeler, "*A Smith–Purcell Free Electron Laser Based On An X–Band Photoinjector*", pp. 1–2 [retrieved on Oct. 11, 2002]. Retrieved from the Internet <URL: http://tempest.das.ucdavis.edu/muri95/icops/5b04.pdf>.

Division of Infrared Spectroscopy, "Research Field", pp. 1–4 [retrieved on Feb. 11, 2002]. Retrieved from the Internet: <URL: hhtp[11]//www.rism.tohoku.ac.jp/irlab/topics.html>.

(1999), "Characterization of Biological Systems with Far Infrared and THz Radiation", pp. 1–3 [retrieved on Feb. 21, 2002]. Retrieved from the Internet: <URL: http://www.frascati.enea.it/THz–BRIDGE/May3summary.htm>.

(2001), "TH–zBridge progress report", pp. 1–6 [retrieved on Oct. 11, 2002]. Retrieved from the Internet: <URL: http://www.frascati.enea.it/THz–BRIDGE/progress_reports/THz–BRIDGE%20prog%20rep.doc>.

(2001), "THz–Bridge Progress Report", pp. 1–7 [Retrieved on Oct. 11, 2002]. Retrieved from the Internet: <URL: http://www.frascati.enea.it/THz–BRIDGE/progress_reports/9–month–report.PDF>.

THz–Bridge, "Objectives and Expected Achievements" pp. 1–6 [retrieved on Feb. 11, 2002]. Retrieved from the Internet: <URL: http://www.frascati.enea.it/THz–BRIDGE/deser_gen2.htm>.

Hayward S, Kitao A, Berendsen HJ, (1997), "Model–free methods of analyzing domain motions in proteins from simulation: a comparison of normal mode analysis and molecular dynamics simulation of lysozyme", *PubMed* vol. 27 (3), p. 1.

M.F. Kitt, (1970), *Far–Infrared Techniques*, Pion Limited, pp. 12–43.

English Translation of WO 00/72413A2, May 10, 2000, Elässer et al.

J. Urata, M. Goldstein, M.F. Kimmitt, A. Naumov, C. Platt, and J.E. Walsh, (1998) "Superradiant Smith–Purcell Emission", *Physical Review Letters* vol. 80(3), pp. 516–519.

D.L. Woolard, T.R. Globus, B.L. Gelmont, M. Bykhovskaia, A.C. Samuels, D. Cookmeyer, J.L. Hesler, T.W. Crowe, J.O. Jensen, J.L. Jensen, and W.R. Leorop, (2002) "Submillimeter–wave Phonon Modes in DNA Macromolecules", *Physical Review E*, vol. 65 pp. 051903–2–051903–11.

"THz–BRIDGE Progress Report" (period from Feb. 1 to Jul. 31,2002),pp., 1–13 [retrieved on Oct. 11, 2002]. Retrieved from the Internet: <URL: http://www.frascati.enea.it/THz–BRIDGE/progress_reports/16–month–report.PDF>.

* cited by examiner

APPARATUSES AND METHODS FOR GENERATING COHERENT ELECTROMAGNETIC LASER RADIATION

CROSS-REFERENCE TO RELATED APPLICATIONS

This application claims priority to U.S. Provisional Patent Application No. 60/235,149, filed 22 Sep. 2000, the contents of which are herein incorporated by reference in their entirety.

FIELD

This invention relates generally to apparatus and methods for generating coherent electromagnetic radiation using free electron lasers (FEL).

BACKGROUND

In the late 1980's, the research of the late Professor John Walsh at Dartmouth College and others led to the development of tunable, electron beam driven radiation sources to produce electromagnetic radiation at terahertz frequencies in a flexible, tunable, and affordable fashion. Walsh's tunable terahertz lasers are fully described in U.S. Pat. Nos. 5,263,043 and 5,790,585 (hereinafter referred to as "the Walsh patents"). Walsh's work showed that a small, compact, and relatively inexpensive table top free electron laser which utilizes a diffraction grating element could be a commercially practical device to generate far infrared (FIR) or terahertz electromagnetic waves.

The Walsh patents essentially disclose FEL apparatuses that pass an electron beam over a surface of a diffraction grating element (i.e., a resonator) thereby producing electromagnetic radiation. The diffraction grating elements of the Walsh patents are fabricated by machining slots in an aluminum block. With this manufacturing approach, the minimum width of the slots largely depends upon the width of the saw blade used. This can limit the slot widths that can be fabricated. Additionally, the choice of block materials may also be limited since some materials cannot be cleanly machined without chipping or burring occurring at the edges (e.g., in the case of hard materials). Others may tend to flow when machined (e.g., in the case of softer materials). Availability of grating slot dimensions may also be limited as saw blades cannot be made to be arbitrarily thin. Furthermore, the depth and the shape of the interior profile of the slots and the shape of the external surfaces between the slots are not easily controlled in these manufacturing techniques. The saw blade, in its cutting action, may leave burrs on exterior corners and rounded surfaces on interior corners. According to the theory developed by Walsh, the width, depth and shape of the slots is critical in determining the wavelength of operation and the strength of the coupling between the bound electromagnetic radiation modes and the electron beam.

SUMMARY

The present disclosure is directed to laser apparatuses for generating coherent electromagnetic laser radiation having an electron beam generator for generating a beam of electrons, a diffraction grating element, wherein the beam of electrons is directed over the diffraction grating element, and having at least one wing element coupled to the diffraction grating element. In some embodiments, the wing element(s) can be coupled to a top portion of the diffraction grating element. While in others, the wing element(s) can be coupled to a side portion of the diffraction grating element. Additionally, the wing element(s) may have at least one surface that is polished.

In accordance with one aspect of the present disclosure, the wing element(s) can be comprised of a conductive metal, such as copper or aluminum, for example.

In accordance with another aspect of the disclosure, the at least one wing element can be substantially planar, concave or convex. Many embodiments in accordance with the disclosure comprise a set of wing elements coupled to a diffraction grating element. In such embodiments, the set of wing elements may be symmetrical and/or substantially parallel to each other; the set of wing elements may also diverge away from each other or alternatively, converge towards each other.

In accordance with a further aspect of the present disclosure, certain embodiments of the laser apparatus can include a cooling system for cooling the diffraction grating element. In other embodiments, the cooling system can be used to cool the at least one wing element. In yet other embodiments, the cooling system can be used to cool the diffraction grating element and the at least one wing element.

In accordance with yet a further aspect of the present disclosure, the diffraction grating element and the wing element(s) can be manufactured as a micromachine monolithic structure.

The present disclosure is also directed to methods of manufacturing diffraction grating elements comprising obtaining at least one primary conductive sheet and at least one secondary conducting sheet, wherein the height of the at least one primary conductive sheet is different from the height of the at least one secondary conductive sheet, placing the at least one secondary conducting sheet on the at least one primary conductive sheet to form a stack of primary and secondary conductive sheets, and then securing the stack of primary and secondary conductive sheets together. In some embodiments, the stack of primary and secondary conductive sheets can consist of alternating sheets of primary and secondary conductive sheets. In yet other embodiments, the thickness of the at least one primary conductive sheet may be different from the thickness of the at least one secondary conductive sheet. Additionally, the stack of primary and secondary conductive sheets may be secured via a clamping device.

In accordance with another aspect of the disclosure, the methods of manufacturing diffraction grating elements can further consist of placing the at least one primary conductive sheet in a tool fixture before placing the at least one a secondary conducting sheet on the at least one primary conductive sheet, and then aligning the at least one primary conductive sheet and the at least one secondary conducting sheet in the tool fixture. In certain embodiments, the tool fixture can serve to secure the stack of primary and secondary conductive sheets.

In accordance with yet a further aspect of the present disclosure, the at least one primary conductive sheet and the at least one secondary conducting sheet can be comprised of copper. Alternatively, the at least one primary conductive sheet and the at least one secondary conducting sheet can be comprised of aluminum.

Further features and advantages of the present invention will become apparent from the following description of the preferred embodiment and from the claims.

DETAILED DESCRIPTION OF EXEMPLARY EMBODIMENTS

This disclosure is directed to grating coupling free electron laser apparatuses for generating coherent electromagnetic laser radiation and methods for fabricating the same. Grating coupling free electron laser apparatuses are described in U.S. Pat. Nos. 5,263,043 and 5,790,585, both issued to Walsh, the contents of which are incorporated herein by reference in their entireties.

There is a need to develop methods for fabricating diffraction grating elements which provide greater control over the over the gratings' slot width, slot depth and shape. Additionally, since the diffraction grating element is so vital to the production of the desired coherent electromagnetic laser radiation, there is a need to develop improvements over the diffraction grating elements disclosed in the Walsh patents.

Laser apparatuses for generating coherent electromagnetic laser radiation, as applicable herein, comprise an electron beam generator and a diffraction grating element. The electron beam generator generates a beam of electrons that can be directed over the diffraction grating element to produce coherent electromagnetic laser radiation with a desired frequency. For the apparatuses and methods described herein, an electron gun from a disassembled AMRAY 1000 scanning electron microscope was used as the electron beam generator. The electron gun comprises a Spellman High Voltage Power Supply SL50N300/AOL/LR having a max output 50KV at 6ma, however, a wide variety of electron gun and power supply combinations can be used as an electron beam generator. Persons skilled in the art will readily recognize the various embodiments that the electron beam generator can take.

Figure 1A:
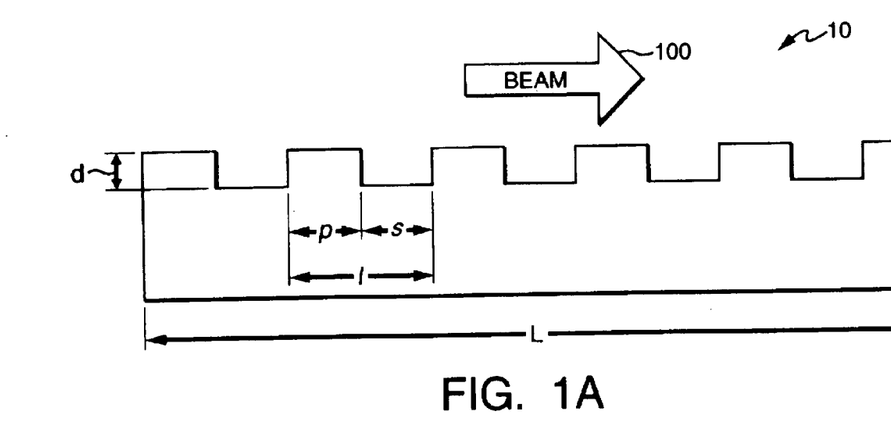
FIG. 1A is a side view of an embodiment of a diffraction grating element.

FIG. 1A depicts a side view of an embodiment of a general diffraction grating element 10 that can be used for generating coherent electromagnetic laser radiation. As shown in FIG. 1A, a beam of electrons 100 generated by an electron beam generator (not shown) is directed over the diffraction grating element 10. The diffraction grating element 10 can be described as having a length (L)—which is along the path traveled by the electron beam 100—, a width (W) [see FIG. 1B], a slot depth (d), a slot width (s), a land width (p) and a period (l), wherein the period (l) equals the slot width (s) plus the land width (p).

Figure 1B:
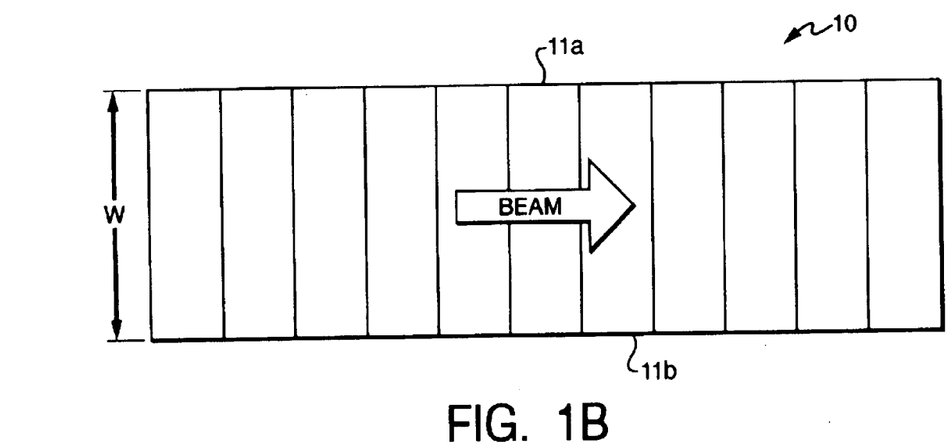
FIG. 1B is a top view of the diffraction grating element shown in FIG. 1A.

FIG. 1B shows a top view of the diffraction grating element 10 of FIG. 1A. Sides 11a and 11b of the diffraction grating element 10 are shown in this figure.

Wing Elements

In an attempt to enhance performance, and more specifically, to increase the power (i.e., amplitude) of the generated laser radiation, wing elements were coupled to the diffraction grating element, as depicted in FIGS. 2–5.

In greater detail, these Figures illustrate different sets of wing elements having different shapes coupled to the diffraction grating element using variously different wing separation dimensions (i.e., the "gap" distance between a first wing element and a second wing element), wing lengths and widths. The introduction of the wing elements can improve power output from 20% to 300% as compared to the power output levels produced from the same diffraction grating elements having no wing elements. A wide variety of conductor that can be fabricated, and preferably polished on one surface (i.e., the surface facing the grating), can be used as a wing element. Also, higher conductivity of the materials used in the wing element can result in improved performance.

It is surmised that since the electron beam used herein generally has a diameter of approximately 25 to 50 microns where it interacts with the grating element that the remainder of the grating width (~6000 microns) might interfere with the generation of Thz radiation by absorbing energy that might otherwise be useful to the generation of Thz. Furthermore, the inclusion of wing elements appears to improve the output coupling of the Thz radiation with free space as well as enhance electron beam interaction with the diffraction grating element.

Wing elements may be coupled to the diffraction grating element and aligned (e.g., substantially parallel) to the electron beam at various distances apart (i.e., the gap) along the full length of the grating. The wing elements protrude out from the face (i.e., the top surface) of the grating element for some distance, such as 6 mm, for example. The wing elements thus can be to cover the "unused" part of the grating element. The wing elements may be used with diffraction grating elements having different geometries (e.g., different d, p and s, etc.).

Experimentally, the addition of wing elements yielded the following results:

| grating #1: | With no wing elements | 17 mV detected at the detector |
| --- | --- | --- |
| | With wing elements, gap set at 3.5 mm | 32 mV detected at the detector |
| grating #2: | With no wing elements | 21 mV detected at the detector |
| | With wing elements, gap set at 1.6 mm | 72 mV detected at the detector |
| | With wing elements, gap set at 1.0 mm | 103 mV detected at the detector |

These results illustrate that the Thz power outputs improved (i.e., increased) when the wing elements were used, and that further increases in Thz power resulted when the gap between the two wing elements was decreased. Thus, the combination us using wing elements with a narrow grating element having an effective width (i.e., the width of the grating element which is exposed to a electron beam) of up to fifty times the electron beam diameter appears to increase the energy output coupling. Another indication of the effectiveness of the wing elements and/or the effectiveness of the narrowing of the grating element is that the grating element "turns on" more easily, meaning at a lower electron beam current for a given voltage.

Figure 2A:
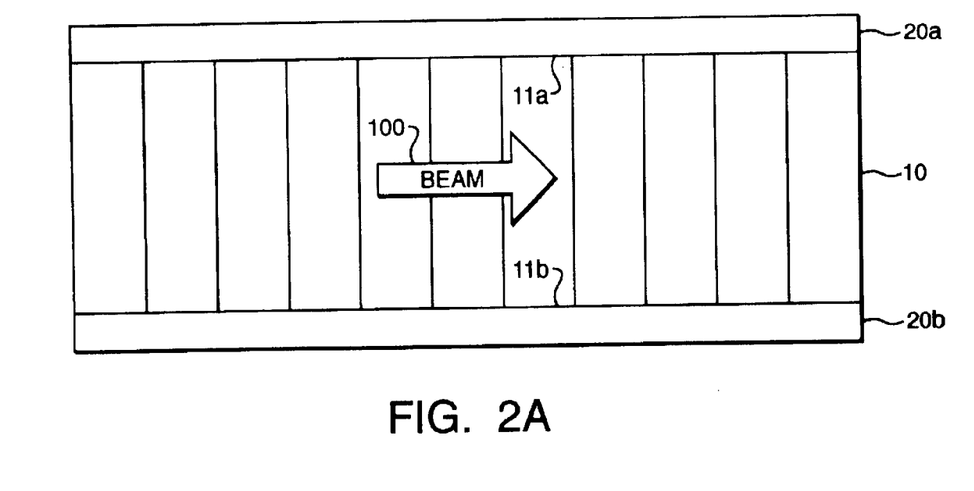
FIG. 2A is a top view of one embodiment of a diffraction grating element having wing elements.
Figure 2B:
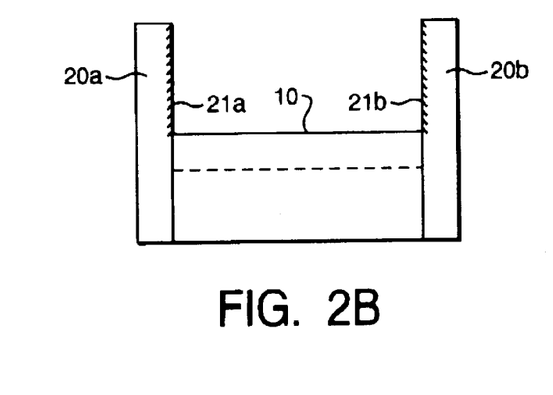
FIG. 2B is a front view of the diffraction grating element having wing elements shown in FIG. 2A.

Exemplary Embodiments of the Wing Elements:

An exemplary embodiment of wing elements 20a and 20b coupled to a diffraction grating element 10 is shown in FIGS. 2A and 2B. The wing elements 20a and 20b as shown in FIGS. 2A and 2B are coupled to the sides 11a and 11b of the diffraction grating element 10. While the wing elements 20a and 20b are shown to extend the entire length (L) of the diffraction grating element 10, this need not be the case. Thus, in other embodiments, the wing elements 20a and 20b may only extend along a portion of the length (L) of the diffraction grating element 10. In preferred embodiments, the inner surface (as determined relative to a central axis of the diffraction grating element where the electron passes) of the wing element may be polished so as to enhance the energy coupling that may occur between the electron beam and the diffraction grating element. For example, in FIG. 2B, surfaces 21a and 21b (indicated by the hash marks) of wing elements 20a and 20b, respectively, are polished. [The term "polished" is herein used to indicate that a particular surface has been prepared so as to increase the reflectivity properties of the surface. This can be accomplished via methods known in the art, such as by grinding, buffing, plating and the like, for example.] Since the embodiment of FIG. 2 has wing elements 20a and 20b which are coupled to the sides 11a and 11b of the diffraction grating element 10, only those portions of the inner surface of the wing elements 20a and 20b which are above the diffraction grating element 10 need to be polished, i.e., as indicated by surfaces 21a and 21b. Additionally, while the wing elements 20a and 20b are shown to be substantially planar (e.g., flat), as is discussed in further detail below, the wing elements 20a and 20b can also be convex, concave or have a complex three-dimensional shape.

The wing elements 20a and 20b and the diffraction grating element 10 may be comprised of materials that are electrically conductive, such as conductive metals, for example. Due to the conductive (and thermal) properties of copper, the wing elements 20a and 20b and diffraction grating element 10 preferably are made of copper, or alternatively, at a minimum, the diffraction grating element 10 and surfaces 21a and 21b of wing elements 20a and 20b, respectively, preferably are comprised of copper. As an alternative to copper, aluminum or another conductive material may also be used. Moreover, in preferred embodiments, wing element 20a (i.e., a first wing element) and wing element 20b (i.e., a second wing element) are symmetrical—meaning that wing element 20a and wing element 20b are mirror-images of each other.

Figure 3:
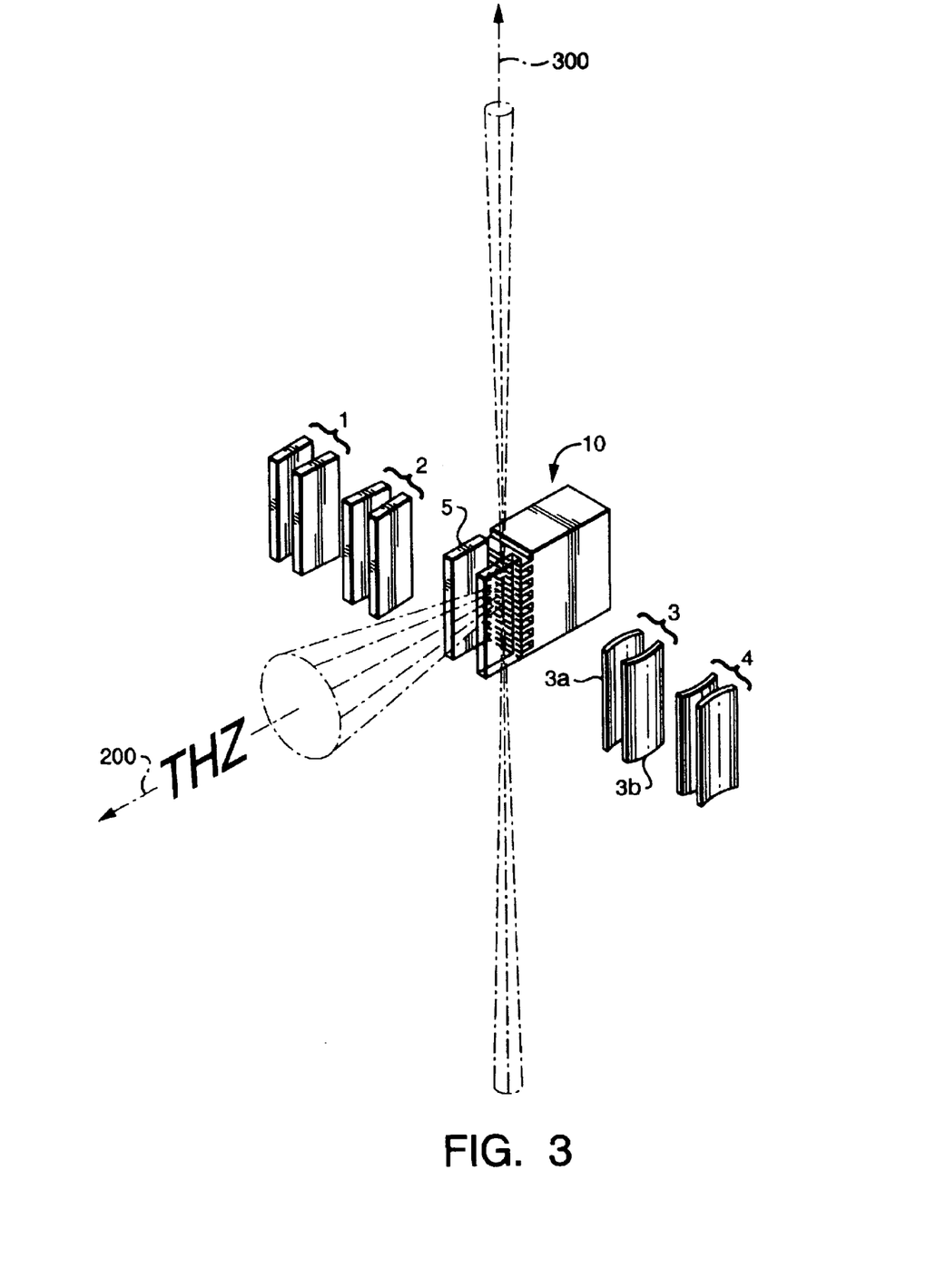
FIG. 3 depicts a diffraction grating element with several different types of wing elements.

FIG. 3 depicts a diffraction grating element 10 with several different sets of wing elements 1–5 that may be coupled to the diffraction grating element 10. Specifically, FIG. 3 depicts the following sets of wing elements which may be coupled to the diffraction grating element 10: a set of converging wing elements 1, a set of diverging wing elements 2, a set of concave (i.e., inwardly curved) wing elements 3, a set of convex (i.e., outwardly curved) wing elements 4 and a set of substantially planar and parallel wing elements 5. The terms "converging" and "diverging" are used herein in reference to the laser radiation axis of travel 200; thus, a set of diverging wing elements 2 diverge away from the axis 200 as one travels away from the diffraction grating element 10. In other words, the gap between the first wing element and the second wing element increases as one moves away from the diffraction grating element 10.

FIG. 3 illustrates that the wing elements 1–5, 20a and 20b, for example, can be coupled to a top portion of the diffraction grating element 10. The wing elements need not be coupled to the sides of the diffraction grating element 10, as is shown in FIG. 2. The individual sets of wing elements 1–5 can be coupled to the top surface of the diffraction grating element 10 at specific locations to create a desired gap between the set of wing elements 1–5. When wing elements are coupled to the top of the diffraction grating element 10 the wing elements can be constructed so as to dam the slots underlying the wing elements (not shown). Alternatively, when the wing elements are coupled to the top of the diffraction grating element 10, damming elements (not shown) separate from the wing elements may be coupled to the sides of the diffraction grating element 10. The coupling of the sets of wing elements 1–5 (or 20a and 20b), and if used the damming elements, to the diffraction grating element 10 can be accomplished by mechanical fasteners (screws, rivets, etc.), mechanical clamping devices or by bonding methods using solder, welding, brazing, epoxies, glues, bonding agents and the like.

Moreover, the set of wing elements 1–5 (or 20a and 20b) can be coupled to the diffraction grating element so that the wing elements are aligned (i.e., oriented) parallel to each other. For example, in the set of concave wing elements 3, wing elements 3a and 3b, can be coupled to the diffraction grating element 10 so that the orientation of wing element 3a (e.g., in relationship to the electron beam axis of travel 300) is substantially parallel to the orientation of wing element 3b.

Figure 4:
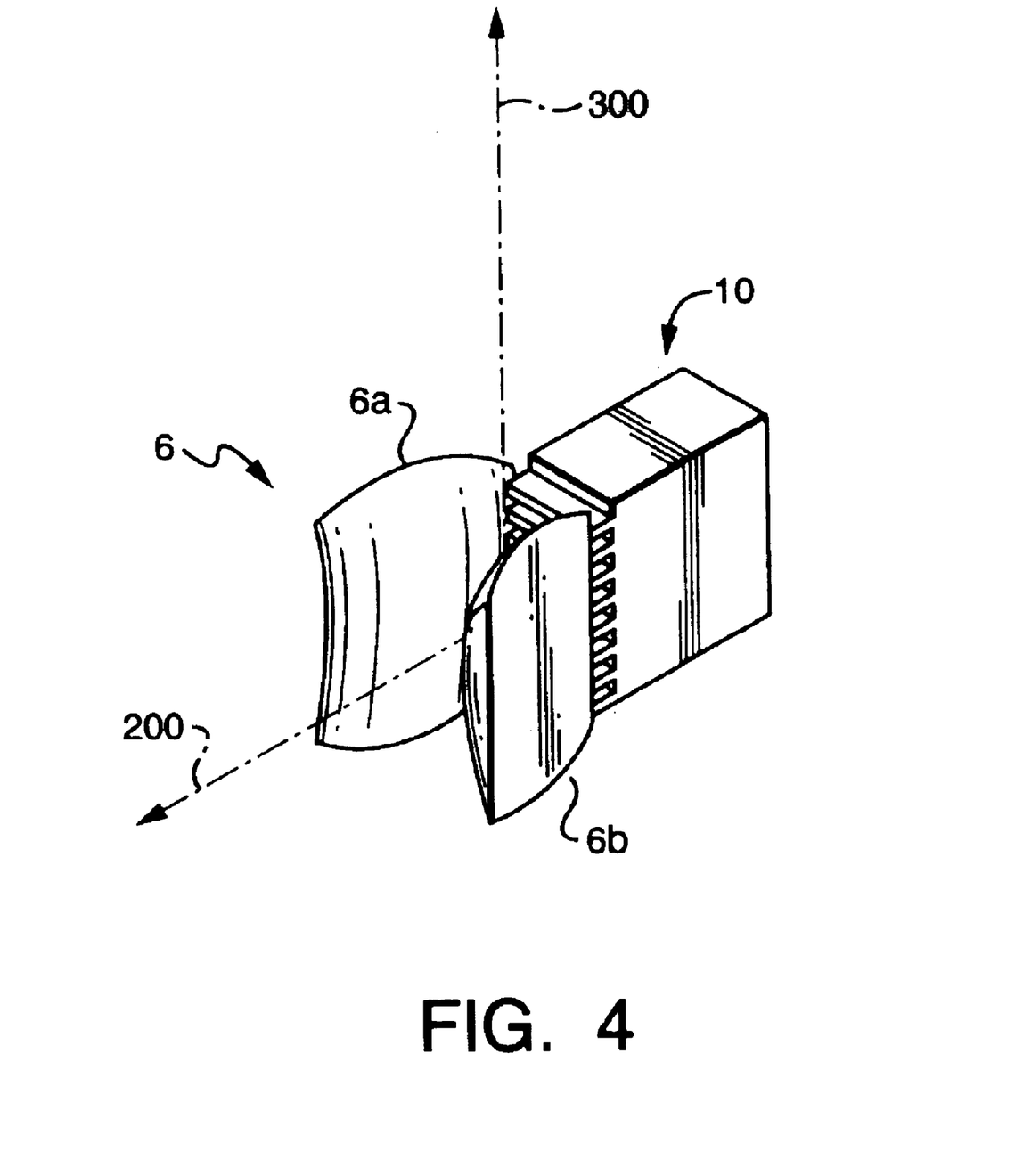
FIG. 4 depicts an embodiment of a diffraction grating element having complex convex wing elements.

FIG. 4 depicts an embodiment of complex convex wing elements 6a and 6b coupled to top portions of the diffraction grating element 10. The wing elements may be planar or curved (e.g., convex or concave). FIG. 4 illustrates that the wing elements can be comprised of complex three-dimensional surfaces (e.g., toroidal). The wing elements 6a and 6b of FIG. 4, for example, are curved (convex) along both the laser radiation axis 200 and the electron beam axis of travel 300.

Figure 5:
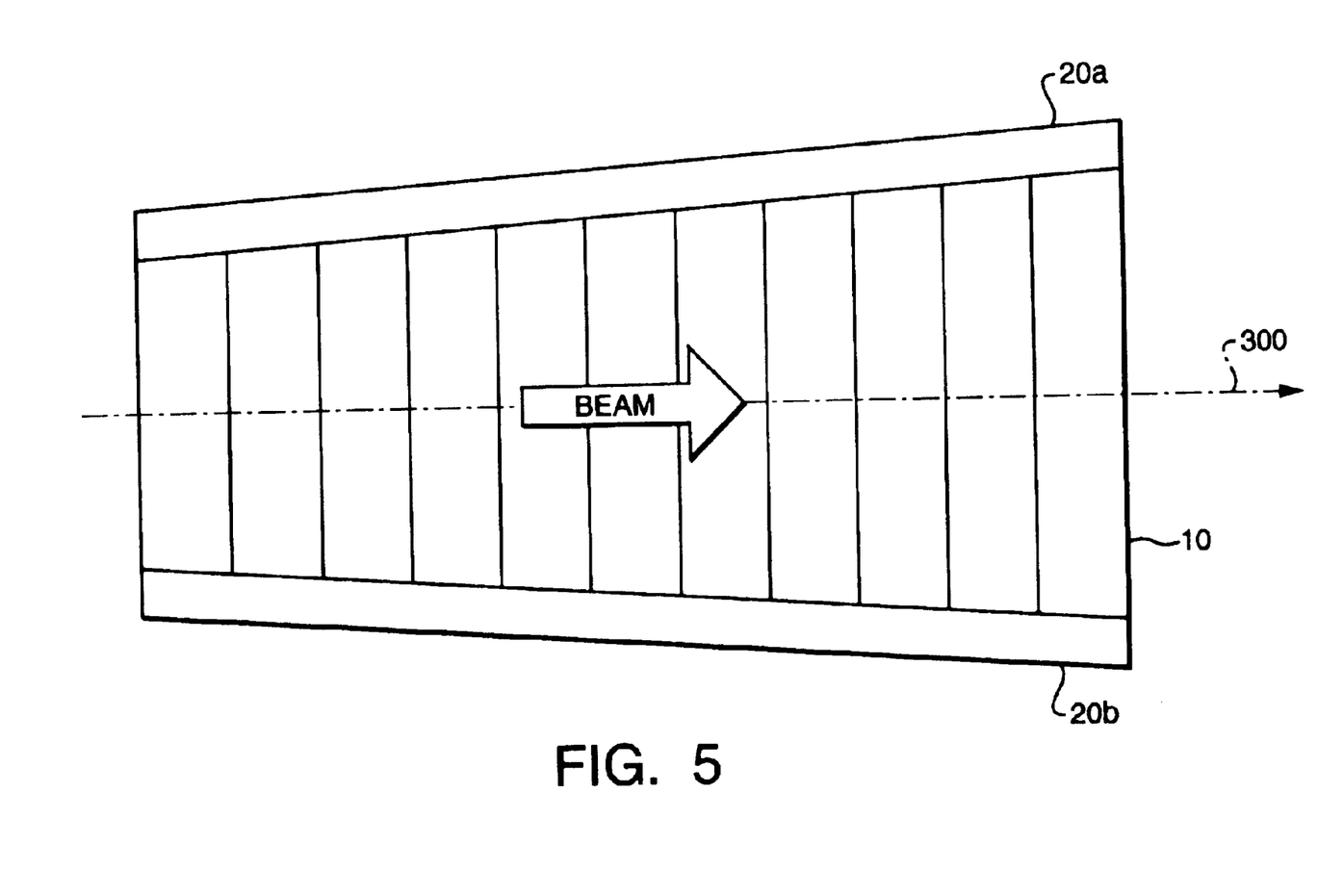
FIG. 5 is a top view of one embodiment of an expanding diffraction grating element having wing elements.

FIG. 5 depicts a top view of one embodiment of an expanding diffraction grating element 10 having wing elements 20a and 20b. The term "expanding" as used herein means that the gap found between a pair of wing elements 20a and 20b, for example, increases as one travels along the electron beam axis of travel 300 (left to right on the page). This expanding gap can be created by either: (1) using a diffraction grating element 10 where the width (W) of the diffraction grating element 10 increases along the axis of travel 300 and wherein the wing elements 20a and 20b are coupled to the side portions of the diffraction grating element 10, or (2) using a diffraction grating element 10 having a constant width (W) and wherein the wing elements 20a and 20b are coupled to top portions of the diffraction grating element 10 in such a way as to create an expanding gap.

Similar to the "expanding" diffraction grating element 10 described above, the diffraction grating element 10 can also be made to be "contracting" wherein the gap found between a pair of wing elements, 20a and 20b, for example, decrease as one travels along the electron beam axis of travel 300. This can be accomplished in much the same manner as discussed above.

Furthermore, the diffraction grating element 10 and wing elements 20a and 20b (or 1–6) could be manufacturing as a micromachine monolithic structure by using semiconductor chip manufacturing technologies known in the art. For example, PCT patent application WO 00/72413 A2, the contents of which are herein incorporated by reference in their entirety, describes such methods in regards to manufacturing diffraction grating structures. Such manufacturing methodologies can be used such that the resultant diffraction grating element 10 and wing elements 20a and 20b structures are electrically conductive.

Diffraction Grating Element Fabrication

Fabricating the diffraction grating element 10 may be done in a variety of ways. Different methods of these permit the manufacturing of such diffraction grating element 10 out of a wide variety of conducting materials.

Figure 6:
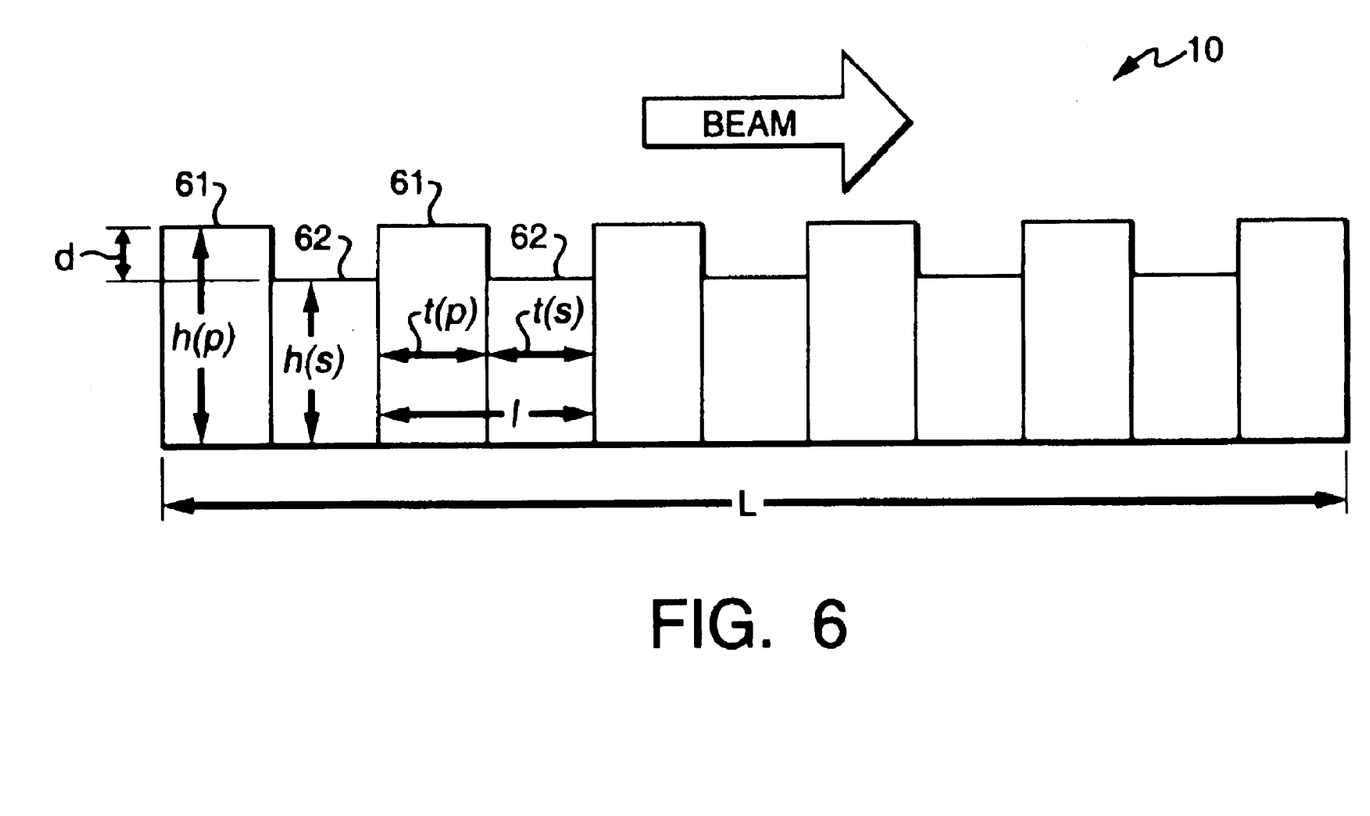
FIG. 6 is a side view of an embodiment of a diffraction grating element fabrication.

Referring to FIG. 6, a diffraction grating element 10 may be manufactured by first obtaining both primary conductive sheets 61—having height h(p) and thickness t(p)—and secondary conducting sheets 62—having height h(s) and thickness t(s)—wherein the height (h(p)) of the primary conductive sheets 61 are different from the height (h(s)) of the secondary conductive sheets 62. A secondary conducting sheet 62 is placed (e.g., stacked) on a primary conductive sheet 61 to form a stack of alternating primary and secondary conductive sheets. Securing the stack of primary and secondary conductive sheets together forms a diffraction grating element 10. By stacking primary conductive sheets 61 and secondary conducting sheets 62 having different heights together, the slot depth (d), slot width (s), land width (p) and period (l) of the diffraction grating element can be precisely controlled. For example, the slot depth (d) can be established by using primary conductive sheets 61 and secondary conducting sheets 62 that have height differences equal to the slot depth (d) that is desired [for example, in FIG. 6 the slot depth (d)=h(p)–h(s)]. By appropriately selecting primary conductive sheets 61 with thickness t(p) and secondary conducting sheets 62 with thickness t(s), the slot width (s), land width (p) and period (l) can similarly be controlled.

Because of its high conductivity and availability in sheets of uniform thickness, copper sheets may be chosen for the primary conductive sheets 61 and secondary conducting sheets 62. For example, the primary conductive sheets 61 may be formed from 0.005 inch copper sheet (e.g., readily-available copper shims). The secondary conducting sheets 62 may be formed from 0.001 inch copper sheet, with a difference in height of 0.004 inch (between the height of the primary conducting sheets 61 and the secondary conductive sheets 62). The diffraction grating element can feature alternating sheets of primary conductive sheets 61 and secondary conductive sheets 62. In addition to copper, a wide variety of electrical conductive sheet material, including aluminum, for example, can be used.

In experiments, the diffraction grating element 10 manufactured from the primary conductive sheets 61 and secondary conductive sheets 62 produced almost twice the output power at wavelengths around 500 $\mu$m as a similar-sized grating element produced by the techniques of the Walsh patents. The improvement in power output can be attributed to a combination of:

1) the improved uniform regularity of the grating allowed by the sheet-stacking fabrication methods;
2) the higher conductivity of copper versus aluminum (as used in the Walsh devices);
3) the narrower slot width (s) allowed by these fabrication methods; and
4) the improved grating profile more exactly approximates the ideal profile with fewer rounded corners and burrs on the diffraction grating element.

One potential advantage of using these methods of manufacturing a diffraction grating element 10 is that commercially-available sheet stock (e.g., copper sheet stock) may be well suited to be used as primary conductive sheets 61 and secondary conducting sheets 62, depending upon the geometry of the diffraction grating element 10 desired. If the available sheet stock is not well suited to the desired geometry, then sheet stock may be rolled to achieve a thickness that will lend itself to the desired geometry of a diffraction grating element. Similarly, available sheet stock may sheared to obtain the primary conductive sheets' 61 height h(p) and/or secondary conducting sheets' 62 h(s) that are better suited to the geometry of a desired diffraction grating element 10.

Figure 7:
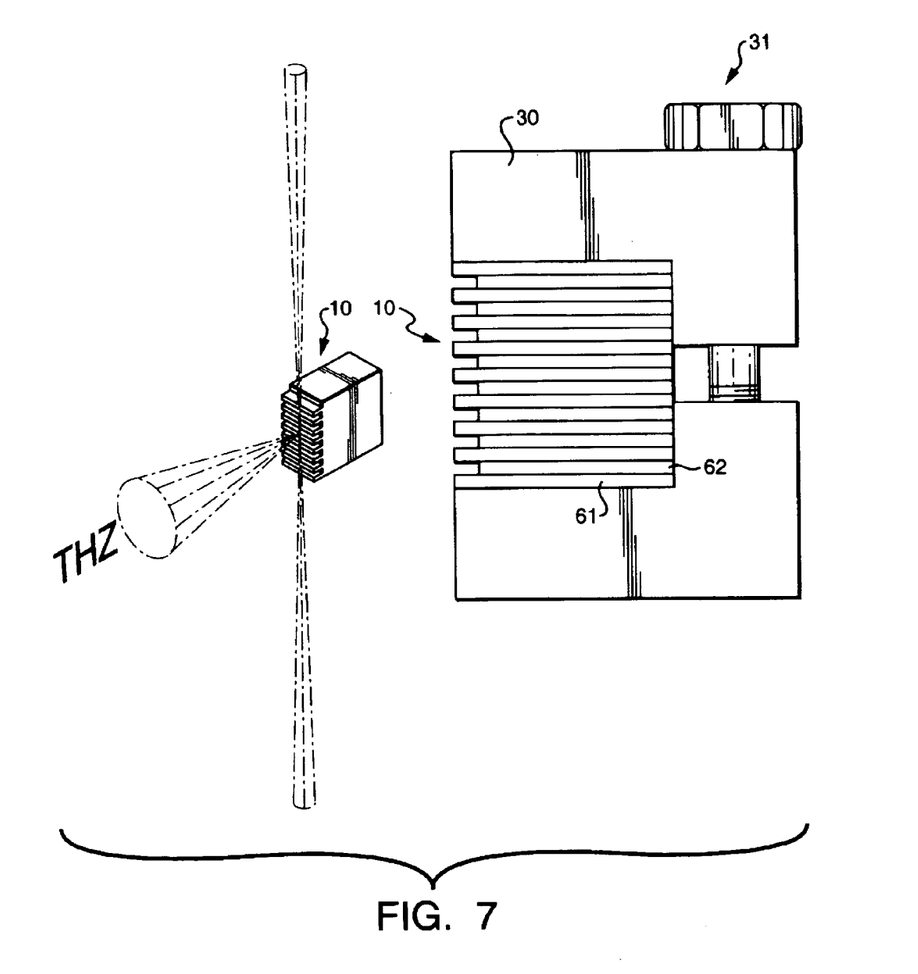
FIG. 7 depicts an embodiment of a diffraction grating element having a clamping device fabrication.

The stack of primary conductive sheets 61 and secondary conductive sheets 62 can be secured via mechanical fasteners (screws, rivets, etc.), mechanical clamping devices or by bonding methods using solder, welding, brazing, epoxies, glues, bonding agents and the like. FIG. 7 illustrates a diffraction grating element 10 formed by several alternating primary conductive sheets 61 and secondary conductive sheets 62 secured by a clamping device 30. The method of fabricating a diffraction grating device 10 can include placing a primary conductive sheet 61 in a tool fixture before placing the secondary conducting sheet 62 on top of the primary conductive sheet 61, and then aligning the primary conductive sheet 62 and the secondary conducting sheet 61 in the tool fixture. This can be repeated until the desired stack of primary conductive sheets 61 and secondary conductive sheets 62 are achieved. The clamping device 30 of FIG. 7 can additionally serve as the tool fixture for stacking and aligning the primary conductive sheets 61 and secondary conductive sheets 62. Thus, the primary conductive sheets 61 and secondary conductive sheets 62 can be aligned in the tool fixture 30 to achieve the desired stack, and then the clamping mechanism 31 (shown as a bolt in this example) can be activated to secure the stack of primary conductive sheets 61 and secondary conductive sheets 62.

Cooling of the Diffraction Grating Element and/or Wing Elements

In grating-coupling free electron lasers, the resonator structure surfaces which come into contact with the electromagnetic fields are electrically conductive. The conductivity of these surfaces plays a role in the efficiency of the resonator structure. Lower conductivity generally means higher losses of energy of the electromagnetic field and therefore a lower "Q" of the resonator, and higher conductivity means lower losses and higher "Q".

Since the electrical conductivity of most metals increase as the temperature of the metal decreases, the output power of grating-coupling free electron lasers will increase as the temperatures of the resonator structures of the lasers are lowered. Many metals can be cryogenically cooled (e.g. to liquid nitrogen temperature or even to liquid Helium temperature) to increase the conductivity of the metal; some metals can even be made to be superconducting by lowering the temperature of the metal to its critical temperature. For example, the conductivity of copper at liquid nitrogen temperature is substantially higher then the conductivity of copper at room temperature.

Figure 8:
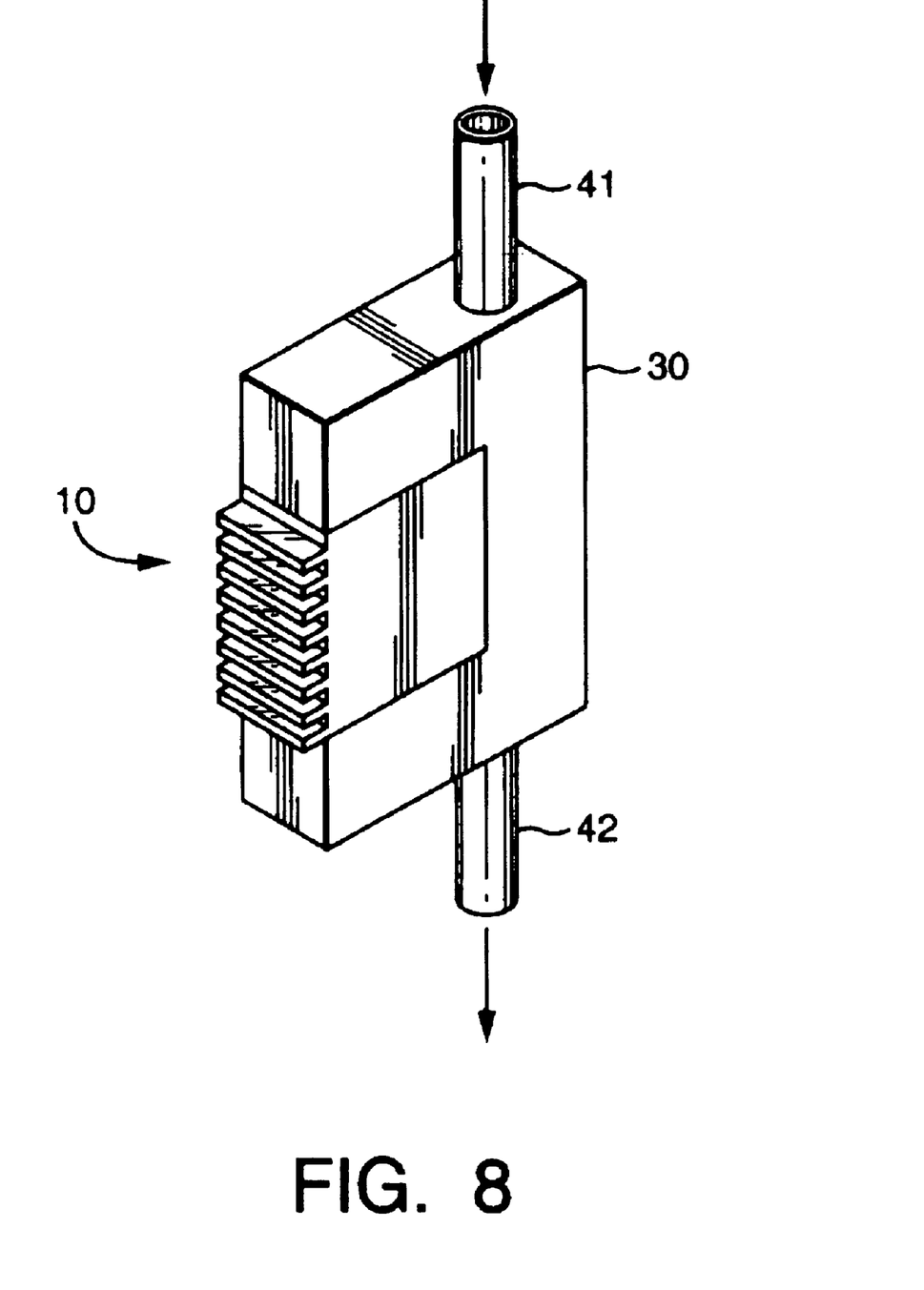
FIG. 8 depicts an embodiment of a diffraction grating element cryogenically cooled by a cooling system.

FIG. 8 depicts an embodiment of a diffraction grating element 10 secured by a clamping device 30 and being cryogenically cooled by a cooling system (not shown). The coolant (i.e., refrigerant) can be delivered to the area of the diffraction grating element 10 via conduit 41 and exit via conduit 42. In this way, the temperature of the diffraction grating element 10 can be controlled. Additionally, while wing elements are not shown in FIG. 8, various embodiments in accordance with this disclosure can permit the cryogenic cooling of the wing elements in concert with the cooling of the diffraction grating element 10, or independent of the cooling of the diffraction grating element 10. The cooling system can have a closed-looped refrigerant cycle and can be any suitable system capable of regulating and maintain the temperature of the reaction vessel 210 at a desired temperature(s). Several of the external refrigerated circulators available from the Julabo USA, Inc., Allentown, Pa., can be used as a cooling system.

The present invention has been disclosed in connection with various laser apparatuses and methods for fabricating diffraction grating elements as shown and described. Various modifications and improvements thereon will, however, become readily apparent to those skilled in the art. The description of the laser apparatuses and methods for fabricating diffraction grating elements should therefore be considered only as illustrative, and not as limiting, of the present invention. The spirit and scope of the present invention is to be limited only by the following claims.

What is claimed is:

1. A laser apparatus for generating coherent electromagnetic laser radiation, comprising:
    an electron beam generator;
    a diffraction grating element forming a grating surface oriented such that a beam of electrons from said electron beam generator is directed over said grating surface; and
    at least one wing element, at least a portion of which:
        is coupled to the diffraction grating element;
        protrudes beyond the plane of said grating surface; and
        is so sized, shaped, and positioned as to receive directly radiation emanating from the grating surface and to reflect the emanated radiation toward an axis normal to the grating surface.

2. The laser apparatus of claim 1, wherein said at least one wing element is coupled to said grating surface of said diffraction grating element.

3. The laser apparatus of claim 1, wherein said at least one wing element is coupled to a side portion of said diffraction grating element.

4. The laser apparatus of claim 1, wherein said at least one wing element comprises at least one surface which is polished.

5. The laser apparatus of claim 1, wherein said at least one wing element comprises a conductive metal.

6. The laser apparatus of claim 5, wherein said conductive metal is copper.

7. The laser apparatus of claim 5, wherein said conductive metal is aluminum.

8. The laser apparatus of claim 1, wherein said at least one wing element is substantially planar.

9. The laser apparatus of claim 1, wherein said at least one wing element is concave.

10. The laser apparatus of claim 1, wherein said at least one wing element is convex.

11. The laser apparatus of claim 1, wherein said at least one wing element comprises:
    a first wing element; and
    a second wing element, and wherein said first wing element is coupled to a first portion of said grating element and said second wing element is coupled to a second portion of said grating element.

12. The laser apparatus of claim 11, wherein said first wing element and said second wing element are symmetrical.

13. The laser apparatus of claim 11, wherein said first wing element and said second wing element are substantially planar, and wherein said second wing element is substantially parallel to said first wing element.

14. The laser apparatus of claim 11, wherein said first wing element and said second wing element are substantially planar, and wherein said second wing element and said first wing element are divergent.

15. The laser apparatus of claim 11, wherein said first wing element and said second wing element are substantially planar, and wherein said second wing element and said first wing element are convergent.

16. The laser apparatus of claim 11, wherein said first wing element and said second wing element are concave, and wherein the orientation of said second wing element is substantially parallel to the orientation of said first wing element.

17. The laser apparatus of claim 11, wherein said first wing element and said second wing element are concave, and wherein said second wing element and said first wing element are divergent.

18. The laser apparatus of claim 11, wherein said first wing element and said second wing element are concave, and wherein said second wing element and said first wing element are convergent.

19. The laser apparatus of claim 11, wherein said first wing element and said second wing element are convex, and wherein the orientation of said second wing element is substantially parallel to the orientation of said first wing element.

20. The laser apparatus of claim 11, wherein said first wing element and said second wing element are convex, and wherein said second wing element and said first wing element are divergent.

21. The laser apparatus of claim 11, wherein said first wing element and said second wing element are convex, and wherein second wing element and said first wing element are convergent.

22. The laser apparatus of claim 1, further comprising:
    a cooling system for cooling at least one of the following: said diffraction grating element and said at least one wing element.

23. The laser apparatus of claim 22, wherein said cooling system comprises a cryogenic cooling system.

24. The laser apparatus of claim 1, wherein said diffraction grating element and said at least one wing element are manufactured as a micromachine monolithic structure.

25. A method for generating coherent electromagnetic laser radiation using the laser apparatus of claim 1, comprising:
    generating a beam of electrons from the electron beam generator; and
    directing said beam of electrons over said diffraction grating element.

26. The method claim 25, said at least one wing element comprises;
    a first wing element; and
    a second wing element, and wherein said first wing element is coupled to a first portion of said grating element and said second wing element is coupled to a second portion of said grating element.

27. The method of claim 25, further comprising:
    cooling at least one of the following: said diffraction grating element and said at least one wing element.

28. The method of claim 25, further comprising:
    actively cooling said diffraction grating element.

29. The method of claim 28, wherein said at least one wing element comprises:
  a first wing element; and
  a second wing element, and wherein said first wing element is coupled to a first portion of said grating element and said second wing element is coupled to a second portion of said grating element.

30. The method of claim 28, further comprising:
  cooling said at least one wing element.

31. A laser apparatus for generating coherent electromagnetic laser radiation, comprising:
  an electron beam generator for generating a beam of electrons;
  a diffraction grating element, wherein said beam of electrons is directed over said diffraction grating element, and wherein said diffraction grating element comprises at least one primary conductive sheet stacked with at least one secondary conducting sheet, and wherein the height of said at least one primary conductive sheet is different from the height of said at least one secondary conductive sheet.

32. The laser apparatus of claim 31, wherein said diffraction grating element includes stacked alternating sheets of said primary and secondary conductive sheets.

33. The laser apparatus of claim 31, wherein the thickness of said at least one primary conductive sheet is different from the thickness of said at least one secondary conductive sheet.

34. The laser apparatus of claim 31, further comprising:
  a clamping device for securing said at least one secondary conducting sheet to said at least one primary conductive sheet.

35. The laser apparatus of claim 31, wherein said at least one primary conductive sheet and said at least one secondary conducting sheet comprise a conductive metal.

36. The laser apparatus of claim 35, wherein said conductive metal is copper.

37. The laser apparatus of claim 35, wherein said conductive metal is aluminum.

38. The laser apparatus of claim 31, further comprising:
  at least one wing element coupled to said diffraction grating element.

39. The laser apparatus of claim 38, wherein said at least one wing element is at least one of the following: planar, convex and concave.

40. The laser apparatus of claim 38, wherein said at least one wing element comprises:
  a first wing element; and
  a second wing element, and wherein said first wing element is coupled to a first portion of said grating element and said second wing element is coupled to a second portion of said grating element.

41. The laser apparatus of claim 40, wherein said first wing element and said second wing element are symmetrical.

42. The laser apparatus of claim 31, further comprising:
  an active cooling system.

43. A laser apparatus for generating coherent electromagnetic laser radiation, comprising:
  an electron beam generator for generating a beam of electrons;
  a diffraction grating element, wherein said beam of electrons is directed over said diffraction grating element, and wherein said diffraction grating element comprises at least one primary conductive sheet stacked with at least one secondary conducting sheet, and further wherein the height of said at least one primary conductive sheet is different from the height of said at least one secondary conductive sheet, the alternating heights thereby forming a grating surface;
  a first wing element protruding beyond said grating surface; and
  a second wing element protruding beyond said grating surface, and wherein said first wing element and said second wing element are symmetrical; and
  a cooling system for cryogenically cooling at least one of the following: said diffraction grating element, said first wing element and said second wing element.

44. A laser apparatus for generating coherent electromagnetic laser radiation, comprising:
  an electron beam generator;
  a diffraction grating element forming a grating surface oriented such that a beam of electrons from said electron beam generator is directed over said grating surface; and
  wing element means for increasing the power of the generated laser radiation.

45. The method of claim 25, wherein the coherent electromagnetic laser radiation generated is terahertz radiation.

46. The method of claim 25, wherein the coherent electromagnetic laser radiation generated has a wavelength in the range of about 10 microns to about 1000 microns.

* * * * *